(12) United States Patent
Nakamura et al.

(10) Patent No.: US 9,139,026 B2
(45) Date of Patent: Sep. 22, 2015

(54) CONTINUOUS SHEET PRINT CONTROL APPARATUS AND METHOD TO SET DISCHARGED SHEET SURFACE ORIENTATION

(71) Applicant: CANON KABUSHIKI KAISHA, Tokyo (JP)

(72) Inventors: Sho Nakamura, Yokohama (JP); Kazunari Shishido, Yokohama (JP); Koji Yasuzaki, Tokorozawa (JP); Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/109,481

(22) Filed: Dec. 17, 2013

(65) Prior Publication Data

US 2014/0104338 A1   Apr. 17, 2014

Related U.S. Application Data

(63) Continuation of application No. 12/960,400, filed on Dec. 3, 2010, now Pat. No. 8,636,430.

(30) Foreign Application Priority Data

Mar. 31, 2010 (JP) ................................. 2010-082798

(51) Int. Cl.
*G06F 3/12* (2006.01)
*B41J 3/60* (2006.01)
(Continued)

(52) U.S. Cl.
CPC ............... *B41J 13/0009* (2013.01); *B41J 3/60* (2013.01); *B41J 11/008* (2013.01); *B41J 15/04* (2013.01); *G06F 3/1251* (2013.01); *G06F 3/1252* (2013.01); *G06K 15/00* (2013.01); *G06K 15/021* (2013.01); *G06K 15/1822* (2013.01); *G06K 2215/0082* (2013.01)

(58) Field of Classification Search
CPC . G06F 3/1251; G06F 3/1252; H04N 1/32465; B41J 3/60
See application file for complete search history.

(56) References Cited

U.S. PATENT DOCUMENTS

| 5,970,304 | A | * | 10/1999 | Stemmle | 399/364 |
| 2002/0192003 | A1 | * | 12/2002 | Koike et al. | 400/621 |
| 2007/0292157 | A1 | * | 12/2007 | Sato | 399/82 |
| 2009/0189929 | A1 | * | 7/2009 | Motojima et al. | 347/2 |
| 2010/0245514 | A1 | * | 9/2010 | Kaimoto et al. | 347/104 |

FOREIGN PATENT DOCUMENTS

| JP | 11227285 A | * | 8/1999 | ............... B41J 21/00 |
| JP | H11-249346 A | | 9/1999 | |

(Continued)

*Primary Examiner* — Daniel J Colilla
(74) *Attorney, Agent, or Firm* — Canon USA, Inc. IP Division

(57) ABSTRACT

An apparatus to cause a print unit to print data on a continuous sheet includes a reception, a determination, and a print control unit. The determination unit determines whether the received data is to be printed on a single or both sides of the continuous sheet. The print unit prints the data in a manner such that a front surface orientation of each duplex printing discharged sheet when discharged after having been printed on its both sides and a front surface orientation of each simplex printing discharged sheet when discharged after having been printed on its single side is the same. When simplex printing is performed, each page to be arranged on the front surface of a discharged sheet of simplex printing is printed first. When duplex printing is performed, each page to be arranged on the back surface of a discharged sheet of duplex printing is printed first.

18 Claims, 4 Drawing Sheets

(51) Int. Cl.
*B41J 29/38* (2006.01)
*B41J 13/00* (2006.01)
*B41J 11/00* (2006.01)
*B41J 15/04* (2006.01)
*G06K 15/00* (2006.01)
*G06K 15/02* (2006.01)

(56) References Cited

FOREIGN PATENT DOCUMENTS

| | | |
|---|---|---|
| JP | 2004-216905 A | 8/2004 |
| JP | 2008-126530 A | 6/2008 |

\* cited by examiner

PRINTING SEQUENCE →

CONTINUOUS SHEET PRINT CONTROL APPARATUS AND METHOD TO SET DISCHARGED SHEET SURFACE ORIENTATION

CROSS REFERENCE TO RELATED APPLICATIONS

The present application is a continuation of U.S. patent application Ser. No. 12/960,400, filed on Dec. 3, 2010, which claims priority from Japanese Patent Application No. 2010-082798, filed Mar. 31, 2010, all of which are hereby incorporated by reference herein in their entirety.

BACKGROUND OF THE INVENTION

1. Field of the Invention

The present invention relates to a print control apparatus and method for use in printing that employs a continuous sheet.

2. Description of the Related Art

There is an apparatus of printing images on both sides of a continuous sheet, such as a roll of paper, by printing data on a single side of the continuous sheet introduced to a print unit, cutting the continuous sheet, temporarily winding the cut continuous sheet, reintroducing the cut continuous sheet to the print unit, and printing data on the opposite side (see, for example, Japanese Patent Laid-Open No. 11-249346). For such a printing apparatus, to enhance the efficiency of printing, images of a plurality of pages are successively printed on a single side, and after the completion of printing the images of all pages on the single side, an image is printed on the opposite side.

For printing with such a procedure, the sequence of pages is determined such that the printing sequence is the above-described sequence. The printed sheet with the image formed on both sides is cut by a cutter into sheets, and the sheets are stacked in succession with their front sides facing downward (face-down discharged). In contrast, for printing on only a single side of a sheet, because it is not necessary to perform printing on the back side of the sheet, the printed sheet with the images formed on its front side is cut by a cutter into sheets, and the sheets are stacked in succession with their front sides facing upward (face-up discharged).

Accordingly, for printing of a continuous sheet in such a way, simplex printing and duplex printing have different sequences of sheets arranged. This complicates checking the printed sheets when a user collects them.

SUMMARY OF THE INVENTION

According to an aspect of the present invention, an apparatus capable of causing a print unit to print data on a continuous sheet includes a reception unit configured to receive data of a plurality of pages to be printed by the print unit, a determination unit configured to determine whether the data of the plurality of pages received by the reception unit is to be printed on a single side of the continuous sheet or on both sides of the continuous sheet, and a print control unit configured to cause the print unit to print the data of the plurality of pages received by the reception unit on the continuous sheet in a manner such that an orientation of a front surface of each discharged sheet of duplex printing from the continuous sheet in a case of being discharged after having been printed on its both sides and an orientation of a front surface of each discharged sheet of simplex printing from the continuous sheet in a case of being discharged after having been printed on its single side is the same, wherein each discharged sheet of duplex printing and of simplex printing have the front surface and a back surface, wherein, in a case where the determination unit determines that simplex printing is to be performed, the print control unit causes the print unit to print each page to be arranged on the front surface of a discharged sheet of simplex printing first, and wherein, in a case where the determination unit determines that duplex printing is to be performed, the print control unit causes the print unit to print each page to be arranged on the back surface of a discharged sheet of duplex printing first.

Further features of the present invention will become apparent from the following description of exemplary embodiments with reference to the attached drawings.

DESCRIPTION OF THE EMBODIMENTS

Embodiments of the present invention are described below with reference to the drawings. Relative arrangement of elements of an apparatus and the shape of the apparatus used in the embodiments are illustrated as merely an example. The embodiments are not limited to the illustrated ones.

Figure 1:
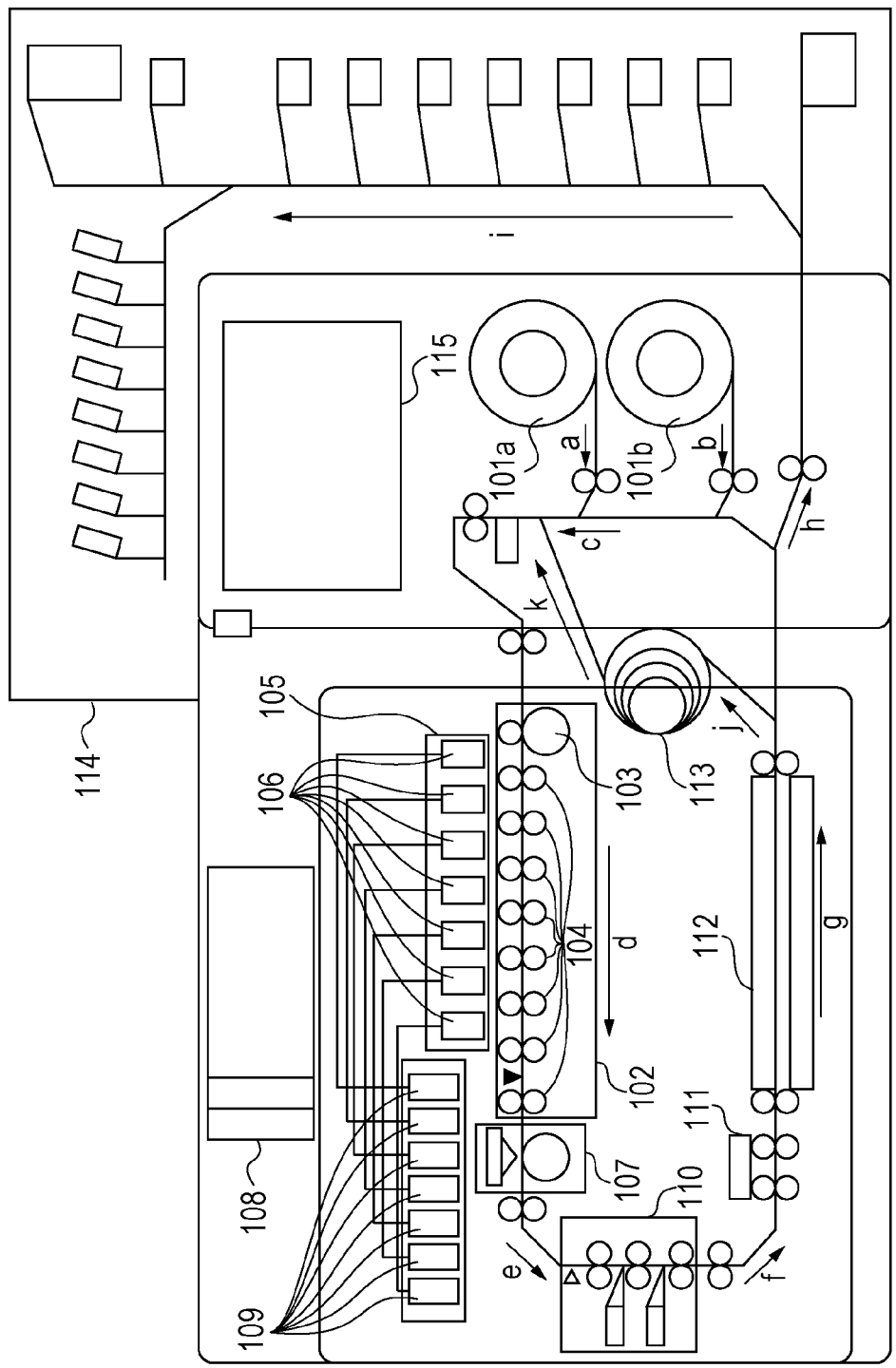
FIG. 1 illustrates a configuration of an image forming apparatus according to an embodiment of the present invention.

FIG. 1 illustrates a schematic configuration of an image forming apparatus that is an example of a print control apparatus according to the present embodiment. For the image forming apparatus in FIG. 1, only components having a printing function of printing data received from an external apparatus are illustrated. However, the image forming apparatus is not limited to the illustrated one. For example, the image forming apparatus can be an apparatus functioning as a copier that further includes a scanner for reading an image on a document or a multifunction apparatus that has other additional functions.

An example that employs a rolled sheet as a recording material (recording medium or recording sheet) that is to be subjected to printing is described. This rolled sheet is an example of a continuous sheet. However, an example other than such a rolled sheet can also be used as long as it is a long continuous sheet that allows data of a plurality of pages to be printed on the same side without being cut before the completion of the printing. A continuous sheet may be automatically cut by the image forming apparatus or manually cut by a user providing an instruction. A recording material can be made of various kinds of materials, including paper, as long as data can be printed thereon. The image forming apparatus can print data on not only a continuous sheet but also a sheet that has been cut into a specific size previously.

A printing process is not limited to the inkjet process employing liquid ink for image printing, which is described below. The printing process may use solid ink as a recording agent to be applied to a recording material. Various processes can be used as the printing process. For example, the electrophotographic process employing toner, dye-sublimation process, thermal transfer process, and dot impact process can be used. Additionally, the printing process can support both color recording employing recording agents corresponding to multiple colors and monochrome recording employing only black, including gray. Moreover, not only a visible image but also an invisible image or an image difficult to visually identify may be printed. Other than a typical image, for example, a wiring pattern, physical pattern in production of parts, and a DNA base sequence may be printed. That is, various types of recording apparatuses can be used as long as they can apply a recording agent to a recording material. When the image forming apparatus illustrated in FIG. 1 controls operations of printing in response to an instruction from an external apparatus connected to the image forming apparatus, this external apparatus is a print control apparatus.

FIG. 1 is a cross-sectional view that illustrates a schematic configuration in general of an image forming apparatus that employs, as a recording material, a rolled sheet (continuous sheet that is longer than a printing unit (one page) in the direction of conveyance). The image forming apparatus includes components 101 to 115 arranged in a single housing. These components may alternatively be arranged in a plurality of housings.

A control unit 108 includes a controller, an output device, and a control unit that are incorporated therein. The controller includes a central processing unit (CPU) or microprocessor unit (MPU). The output device outputs user interface information and can be a generator that generates display information and acoustical information. The control unit includes various input/output (I/O) interfaces. The control unit 108 excises control over the image forming apparatus.

Two units for holding and supplying a rolled sheet are an upper sheet cassette 101a and a lower sheet cassette 101b. A user attaches a rolled sheet (hereinafter referred to as a sheet) to a magazine and then loads it to the main body of the image forming apparatus. A sheet drawn out of the upper sheet cassette 101a and that of the lower sheet cassette 101b are conveyed along the directions "a" and "b" illustrated in the drawing, respectively. The sheet from each of the cassettes travels along the direction "c" illustrated in the drawing and reaches a conveying unit 102. The conveying unit 102 conveys the sheet during printing along the direction "d" illustrated in the drawing (substantially horizontal direction) while causing the sheet to pass through a plurality of rollers 104. To switch a sheet supplier from a first sheet cassette to a second sheet cassette, a drawn sheet is rolled back to the first cassette and a new sheet is supplied from the second cassette.

A head unit 105 is arranged above the conveying unit 102 so as to face it. In the head unit 105, a plurality of independent print heads 106 corresponding to the number of colors (seven for the present embodiment) are held along the direction of conveyance of a sheet. For the present embodiment, the seven print heads 106 correspond to seven colors of cyan (C), magenta (M), yellow (Y), light cyan (LC), light magenta (LM), gray (G), and black (K). However, colors other than these colors may be used, or any or any combination of those colors may be used.

The image forming apparatus forms an image on a sheet by ejecting ink from the print heads 106 in synchronization with conveyance of the sheet by the conveying unit 102. The print heads 106 are arranged at locations where droplets ejected therefrom do not overlap the rollers 104. Ink is ejected directly to a sheet. However, other ways may be used. For example, ink may alternatively be applied to an intermediate transfer member, and the applied ink is provided to a sheet, thus forming an image on the sheet.

A unit for printing according to the present embodiment is configured to include the conveying unit 102, head unit 105, and print heads 106.

Independent ink tanks 109 store their respective inks corresponding to colors. Each of the ink tanks 109 supplies the ink through a tube to a sub tank provided to the corresponding color. The ink is supplied from the sub tank to the corresponding print head 106 through a tube. For the print heads 106, line heads corresponding to the colors (seven colors for the present embodiment) are arranged along the direction "d" of conveyance of a sheet during printing. The line heads may be made of a single seamless nozzle chip or may alternatively be formed as separated nozzle chips regularly arranged in one row or in a staggered configuration. For the present embodiment, a head in which nozzles are arranged in a range that covers the width of a printing region of a sheet at a usable maximum size, which is a so-called full-multi head, is employed. The inkjet process ejecting ink from the nozzles may use various systems, such as a system employing a heating element, that employing a piezoelectric element, that employing an electrostatic element, and that employing a micro-electric-mechanical system (MEMS) element. Ink is ejected from the nozzles of each head in response to print data. The time of ejecting ink is determined based on an output signal of a conveyance encoder 103.

After an image is formed on a sheet, the sheet is conveyed from the conveying unit 102 to a scanner unit 107. The scanner unit 107 checks whether there is no problem in a formed image by optically reading the formed image or a special pattern on the sheet and checks the condition of the apparatus, including an ink ejection condition. A method of checking a formed image may be examining an ink ejection condition by reading a pattern for use in checking the condition of a head or determining whether printing is successful or not by comparing the formed image with an original image. An appropriate checking method may be selected from among various ones.

A sheet is conveyed from the vicinity of the scanner unit 107 along the direction "e" and is introduced into a cutter unit 110. The cutter unit 110 cuts the sheet by a specific printing unit length. The specific printing unit length varies depending on the size of an image to be printed. For example, for a photograph having a Japanese regular photograph print size (approximately 89×127 mm), the length in the direction of conveyance is approximately 135 mm; for A4 size, the length in the direction of conveyance is approximately 297 mm. For simplex printing, the cutter unit 110 typically cuts a sheet on a page basis; however, it may not cut a sheet on a page basis depending on the content of a print job. For duplex printing, after images are successively printed on a first side (a side on which printing is first performed) of a sheet for a specific length without the sheet being cut on a page basis, the cutter unit 110 cuts the sheet on a page basis when an image is printed on a second side (a side that is opposite to the first side and is subsequently subjected to printing). However, for simplex printing or printing on a back side in duplex printing, the cutter unit 110 may not cut a sheet for each image. For example, the cutter unit 110 may not cut a sheet until a specific length of the sheet is conveyed, and the sheet may be cut for each image of one page by another cutter device in response to a manual operation. If it is necessary to cut a sheet in its width direction, another cutter device cuts it.

A sheet from the cutter unit 110 is conveyed along the direction "f" illustrated in the drawing to a back-side print unit 111. The back-side print unit 111 is a unit for printing specific information on the back side of a sheet when only a single side of the sheet is subjected to printing. Examples of information printed on the back side of a sheet include a character, symbol, and code (e.g., order management number) corresponding to each print image. For printing images for a print job of duplex printing using the print heads 106, the back-side print unit 111 prints the above-described information on an area other than a printing region where the images are printed using the print heads 106. The back-side print unit 111 can use stamping employing a recording agent, thermal transferring, and ink jetting.

A sheet passing through the back-side print unit 111 is conveyed to a drying unit 112. The drying unit 112 is a unit that heats a sheet passing therethrough along the direction "g" illustrated in the drawing with a warm current of air (heated gas (air)) to dry the sheet with ink being applied thereon in a short period of time. Various drying methods other than a method employing a warm current of air can also be used. For example, drying employing a cool current of air, that by heating by a heater, natural drying only by letting the sheet wait, drying by radiation with electromagnetic waves, such as ultraviolet light, can also be used. The sheets cut into specific printing unit lengths pass through the drying unit 112 one by one and are conveyed along the direction "h" illustrated in the drawing to a sorting unit 114.

The sorting unit 114 includes a plurality of trays (18 for the present embodiment) and selectively uses a tray for receiving a discharged sheet depending on, for example, its printing unit length. The trays have individual tray numbers. The sorting unit 114 discharges each of the sheets passing therethrough along the direction "i" illustrated in the drawing to a tray associated with the tray number set for each print image while checking by a sensor provided to each tray whether the tray is available, whether it is full of sheets, or other conditions. A tray for receiving a discharged cut sheet to be discharged can be specifically set by a source (host apparatus) of a print job or can be freely set by the image forming apparatus at an available tray. The maximum number of sheets that can be discharged to a single tray is previously set. For a print job exceeding the previously set maximum number of sheets, the sheets are discharged to a plurality of trays. The maximum number of sheets and the size and type of a sheet that can be discharged to a tray vary with the size (type) of the tray. In FIG. 1, trays arranged substantially vertically (from top to bottom), which are hereinafter referred to as large trays, can receive both a sheet with a large size (e.g., A4, which is larger than, for example, a Japanese regular photograph size of approximately 89×127 mm) and a sheet with a small size (e.g., approximately 89×127 mm). Trays arranged substantially horizontally (from left to right), which are hereinafter referred to as small trays, can receive a sheet with a small size (e.g., approximately 89×127 mm), but cannot receive a sheet with a large size. The number of sheets that can be discharged to each of the large trays is greater than that to each of the small trays.

A condition, such as discharging sheets in progress or completion of discharging, can be identified by a user through an indicator, which can employ a light-emitting diode (LED), for example. Specifically, for instance, each of the trays is provided with a plurality of LEDs emitting different color beams, and a user can be notified of various conditions of the tray by seeing the color of an illuminating LED or the state of illumination of the LED, such as lighting up or blinking. Priorities can be assigned to the trays, and the image forming apparatus can assign available trays (empty of sheets) in sequence to a destination of discharging sheets according to the priorities. The default is that, for the large trays, higher trays have higher priorities and, for the small trays, trays at more left side have higher priorities. The large trays have higher priorities than those for the small trays. A higher priority may be assigned in advance to a tray from which a user can take a sheet easily. The priorities can be changed by an operation from a user.

A sheet winding unit 113 winds a sheet that has images formed on its first side without being cut on a page basis. For duplex printing, the cutter unit 110 does not cut a sheet that has images formed on its first side on a page basis and cuts the sheet after the last image of successive images printed on the first side has passed therethrough. The sheet having the images formed on its first side moves along the direction "j" illustrated in the drawing and is wound by the sheet winding unit 113. The sheet cut by the cutter unit 110 after the completion of printing the images of a series of pages on the first side is conveyed again from the sheet winding unit 113 such that the side opposite to the first side is used as a side on which an image can be printed. That is, the sheet winding unit 113 reverses a side of the sheet having images formed on its first side that faces the print heads 106 and conveys it again along the direction "k" illustrated in the drawing. At this time, a part of the sheet at which the sheet has been cut is first conveyed. Conveyance in such a way enables printing images on the side (second side) opposite to the first side. For normal simplex printing, a sheet on which images are printed is conveyed to the sorting unit 114 without being wound by the sheet winding unit 113.

In this way, for duplex printing, a sheet is wound by the use of the sheet winding unit 113, the sheet is reversed, and then the second side is subjected to printing. Therefore, if printing is performed in ascending order of page numbers, the orientation of a sheet surface and the sequence of sheets arranged in a discharge to the sorting unit 114 are different from those for simplex printing. That is, for simplex printing, because reversal of a sheet using the sheet winding unit 113 does not occur, a sheet with the image of the first page being printed thereon is discharged in a state where the image of the first page faces downward. For a single print job having a plurality of pages, a sheet of the first page is first discharged to a tray and subsequent pages are discharged in succession, and they are stacked. This type of discharging is called face-down discharging. In contrast, for duplex printing, because a sheet is reversed using the sheet winding unit 113, a sheet on which the image of the first page is printed is discharged in a state where the image of the first page faces upward. For a single print job requiring outputting a plurality of sheets, a sheet containing the last page is first discharged to a tray, subsequent pages of sheets are discharged in descending page order in succession and stacked, and a sheet on which the image of the first page is printed is finally discharged. This type of discharging is called face-up discharging. In contrast to this, for the present embodiment, to avoid the orientation of a surface of a discharged sheet that faces a tray (hereinafter also referred to as a discharge surface) and the sequence of sheets arranged from differing between simplex printing and duplex printing, different printing sequences are used in simplex printing and duplex printing. The details are described below.

An operating unit 115 is a unit through which a user inputs various operations or is notified of various kinds of information. For example, a user can identify, on an order basis, a printing condition, such as which tray a sheet having an image specified by a user being printed thereon is stacked or whether the image is being printed or has already been printed. In addition, a user can manipulate the operating unit 115 to identify various statuses of the apparatus, such as the amount of remaining ink and the amount of remaining sheet, or to provide an instruction to conduct maintenance for the apparatus, such as head cleaning.

Figure 2:
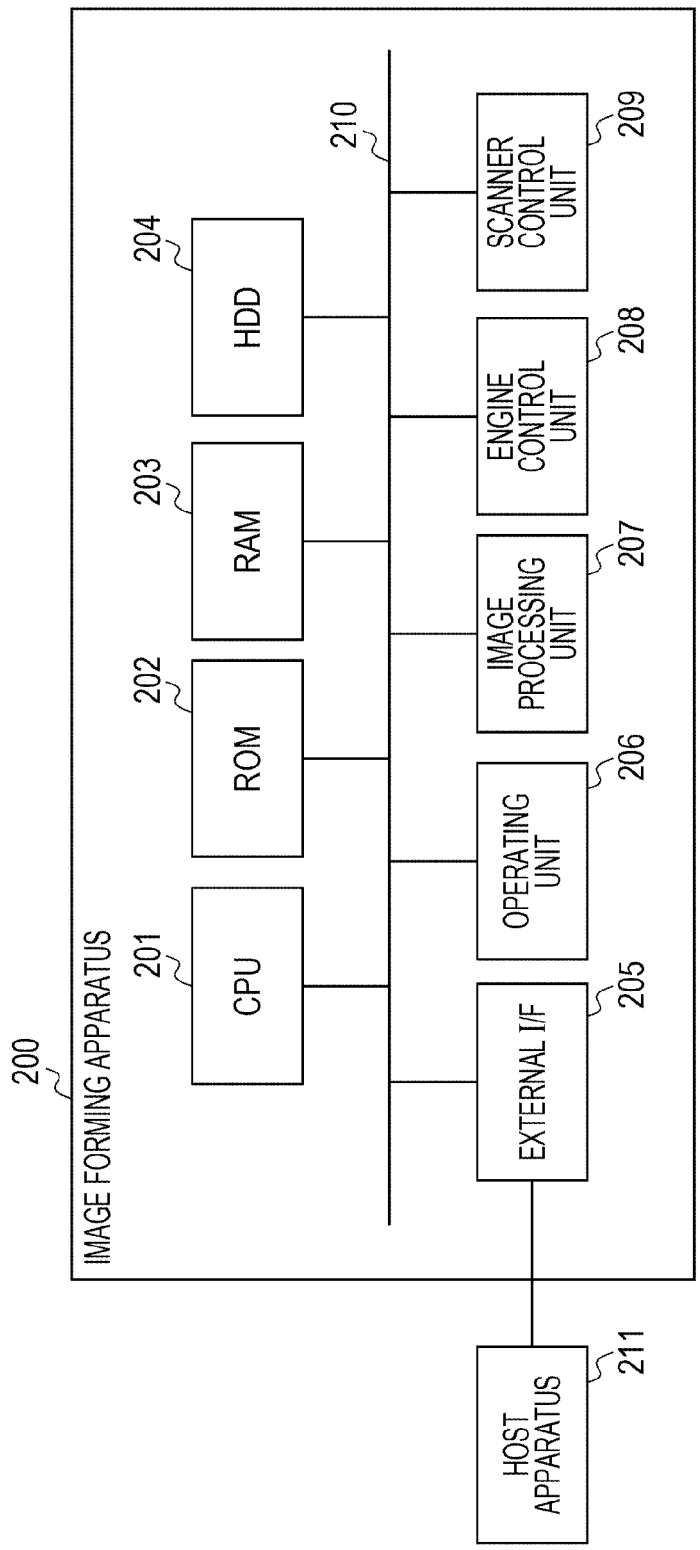
FIG. 2 is a block diagram of a configuration for use in controlling the image forming apparatus illustrated in FIG. 1.

FIG. 2 is a block diagram of a configuration for use in controlling the image forming apparatus illustrated in FIG. 1. An image forming apparatus 200 is the image forming apparatus illustrated in FIG. 1. The illustrated configuration is merely an example, and various changes can be made.

The control unit 108 includes a CPU 201, a read-only memory (ROM) 202, a random-access memory (RAM) 203, an image processing unit 207, an engine control unit 208, and a scanner control unit 209. The control unit 108 is connected to a hard disk drive (HDD) 204, an operating unit 206, and an external interface (I/F) 205 through a system bus 210.

The CPU 201 is a central processing unit having a microprocessor (microcomputer) form and is included in the control unit 108 illustrated in FIG. 1. The CPU 201 executes a program and exercises control over operations of the image forming apparatus 200 in response to activation of hardware. The ROM 202 stores programs executable by the CPU 201 and fixed data necessary to various operations of the image forming apparatus 200. The RAM 203 is used as a work area of the CPU 201, as a temporary storage region for various kinds of received data, and stores various kinds of data of settings. The HDD 204 can store, in an internal hard disk, programs executable by the CPU 201, print data, and information on settings necessary to various operations of the image forming apparatus 200 and can read any of them therefrom. Instead of the HDD 204, other mass-storage devices may be employed.

The operating unit 206 can include a hard key and a touch panel for use in inputting various operations from a user and a display section for providing (notifying) various kinds of information to a user and corresponds to the operating unit 115 illustrated in FIG. 1. Information can be provided to a user by the use of an output sound (e.g., buzzer sound or voice) based on sound information from a sound generation device.

The image processing unit 207 develops (converts) print data (e.g., data represented by page description language) handled by the image forming apparatus 200 into image data (bitmap image) and performs image processing. For example, the image processing unit 207 converts a color space (e.g., YCbCr) of image data contained in input print data into a standard RGB color space (e.g., sRGB). Various kinds of image processing are performed on image data; examples thereof include resolution conversion into an effective number of pixels (with that number, the image forming apparatus 200 can perform printing thereon), image analysis, and image correction. Image data obtained through such image processing is stored in the RAM 203 or HDD 204.

The engine control unit 208 controls processing of printing an image based on print data on a sheet in response to a control command from the CPU 201 or other elements. For example, the engine control unit 208 provides the print head 106 associated with each color with an instruction to discharge ink, sets discharge timing for use in adjusting the position of a dot on a recording medium (ink landing position), and carries out adjustment based on an obtained head driven state. The engine control unit 208 also controls driving of the print head in accordance with print data, causes the print head to discharge ink to form an image on a sheet. In addition, the engine control unit 208 provides an instruction to drive an extracting roller for extracting a sheet from a cassette and controls a conveying roller for conveying the extracted sheet, such as providing an instruction to drive the conveying roller and obtaining a rotation state of the conveying roller, thus conveying the sheet at an appropriate speed and through an appropriate path and stopping the sheet.

The scanner control unit 209 controls an image sensor in response to a control command received from the CPU 201 or other elements, reads an image on a sheet, obtains analog luminance data for red (R), green (G), and blue (B), and converts the analog data into digital data. Examples of the image sensor can include a charge-coupled device (CCD) image sensor and a complementary metal-oxide semiconductor (CMOS) image sensor. The image sensor can also be a linear image sensor or an area image sensor. The scanner control unit 209 provides an instruction to drive the image sensor, obtains a state of the image sensor based on the driving, analyzes luminance data obtained from the image sensor, and detects non-discharging of ink from the print head 106 and the position of cutting the sheet. A sheet whose image is determined by the scanner control unit 209 to have been correctly printed is subjected to processing of drying ink on the sheet. Then, the sheet is discharged to a specified tray of the sorting unit 114.

A host apparatus 211 corresponds to the above-described external apparatus. The host apparatus 211 is externally connected to the image forming apparatus 200 and is a source of supplying image data to be printed by the image forming apparatus 200. The host apparatus 211 issues orders of various print jobs.

The host apparatus 211 may be achieved by a general-purpose personal computer (PC) or other types of data supply apparatus. An example of the other types of data supply apparatus can be an image capture apparatus for capturing an image and generating image data. Examples of the image capture apparatus can include a reader (scanner) that reads an image on a document and generates image data and a film scanner that reads information from a negative film or a positive film and generates image data. Other examples of the image capture apparatus can include a digital camera that obtains a still image and generates digital image data and a digital video camera that picks up movie and generates movie image data. Alternatively, an image file may be read from a photographic storage placed on a network or from a mobile memory detachably inserted into a socket of the image forming apparatus 200, image data may be generated therefrom, and the data may be printed. In place of a general-purpose PC, various data supply apparatuses can be used. For example, a terminal dedicated to the image forming apparatus may be used. The data supply apparatus may be a component of the image forming apparatus, or alternatively, may be a different apparatus externally connected to the image forming apparatus. When the host apparatus 211 is a PC, an operating system (OS), application software for generating image data, and a printer driver for use by the image forming apparatus 200 are installed in storage of the PC. The printer driver controls the image forming apparatus 200 and converts image data supplied from the application software into a form that can be handled by the image forming apparatus 200 to generate print data. Conversion of print data into image data may also be carried out by the host apparatus 211 before the data is supplied to the image forming apparatus 200. Not all of the above-described processing may be achieved by software; part or all thereof may be achieved by hardware, such as an application-specific integrated circuit (ASIC). Image data, other commands, status signals supplied from the host apparatus 211 may be exchanged with the image forming apparatus 200 through the external I/F 205. The external I/F 205 may be a local I/F or a network I/F. The external I/F 205 may be achieved by cable connection or wireless connection.

The above-described elements within the image forming apparatus 200 are connected through the system bus 210 and can communicate with one another.

For the above-described example, the single CPU 201 controls all of the components within the image forming apparatus 200 illustrated in FIG. 2. However, other configurations may be used. That is, some of the functional blocks may have own CPUs, and the CPUs may individually control their respective blocks. Various forms can be used for the functional blocks. For example, the functional blocks may be divided into individual processing units or control units such that they have share different from that in the configuration illustrated in FIG. 2, or some of them may be integrated. A direct memory access controller (DMAC) may also be used in reading data from memory.

Figure 3A:
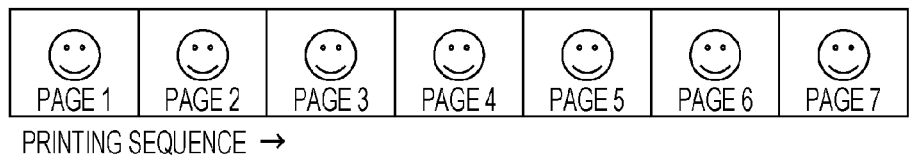
FIGS. 3A and 3B illustrate arrangements of images for simplex printing and duplex printing.
Figure 3B:
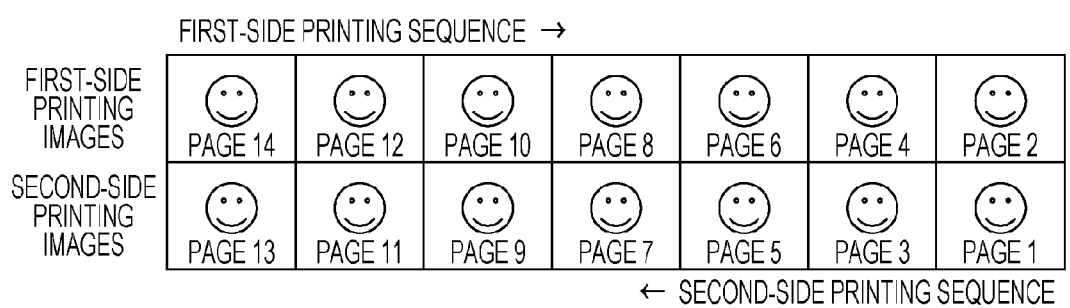

FIGS. 3A and 3B illustrate a case where the image forming apparatus 200 performs printing on only a single side of a rolled sheet and a case where it performs printing on both side thereof. The images of pages illustrated in FIGS. 3A and 3B are arranged without a gap. However, a margin may be provided between pages. That is, in the following, successively printing a plurality of images contains a case where a margin is provided between images and indicates continuing printing on the same side (without cutting the sheet for the first side of duplex printing). In FIGS. 3A and 3B, an image of one page is arranged on each side of one sheet to be discharged to a tray. However, images of a plurality of pages may be arranged on the same side. In both the cases illustrated in FIGS. 3A and 3B, seven sheets are discharged on a tray. For duplex printing, among a series of sheets discharged to a tray, a sheet on which only its single side is subjected to printing may exist. However, for the illustrated case, both sides of all the sheets are subjected to printing.

For printing on only a single side of a sheet, first, print data of seven pages is input from the host apparatus 211 to the image forming apparatus 200 through the external I/F 205 together with specification information for simplex printing in the sequence of page numbers 1, 2, 3, . . . , and 7. When face-down discharging is set in the image forming apparatus 200 as discharging a printed sheet to a tray, the printing sequence is the same as the inputting sequence, i.e., printing starts from page 1. The printing sequence in this case is illustrated in FIG. 3A. With this, sheets are discharged face down, and pages are arranged in ascending order, thus enabling the sheets to be discharged without sorting by a user.

In contrast, for printing on both side of a sheet, first, print data of 14 pages is input from the host apparatus 211 to the image forming apparatus 200 through the external I/F 205 together with specification information for duplex printing in the sequence of page numbers 1, 2, 3, . . . , and 14. The printing sequence illustrated in FIG. 3B is the one occurring when face-down discharging is set in the image forming apparatus 200 as discharging a printed sheet to a tray. That is, images are arranged alternately on a first side on which an image is first printed and a second side being opposite to the first side. Specifically, on the first side, even-numbered pages are arranged in descending order, whereas on the second side, odd-numbered pages are arranged in ascending order. That is, for printing on the first side (printing on a sheet supplied from the upper sheet cassette 101a or the lower sheet cassette 101b), simplex printing and duplex printing have opposite sequences of pages arranged (ascending order for simplex printing and descending order for duplex printing). For printing on the second side of duplex printing (printing on a sheet supplied from the sheet winding unit 113), the sequence of pages is the same as that in simplex printing (ascending order). Accordingly, the sheets are discharged face down in ascending order, as in the case of simplex printing. Arrangement of pages for printing on both sides of a sheet varies in response to the content of specified printing. That is, pages may be arranged differently from those illustrated in FIG. 3B. For example, if bookbinding printing is specified, the last page (here, page 14) is arranged on the opposite side of page 1. A case where printing is specified so as to exhibit arrangement illustrated in FIG. 3B is described below as an example.

For normal duplex printing using cut sheets, in accordance with the sequence of inputted pages, images are printed in the sequence of page 1 (on the first side), 2 (on the second side), 3 (on the first side), . . . , 13 (on the first side), and 14 (on the second side). However, for the image forming apparatus 200, which employs a rolled sheet, if printing is performed in this sequence, it is necessary to cut a sheet after an image is printed on the first side and, after winding the sheet and reversing the sheet, to print a next image on the second side. The duplex printing way of completing printing for each sheet to be discharged to a tray needs a long time. Accordingly, for the present embodiment, the first side of a sheet for all of a series of pages is subjected to printing, and the sheet is then cut. The cut sheet is wound, the sheet is reversed, and images for the remaining second sides are successively printed. Every time an image of one page is printed on the second side, the sheet is cut for the one page. This can eliminate the necessity of reversing a sheet every time an image is printed on a single side of the sheet and thus can shorten the time required for printing. That is, in response to a print job, the image forming apparatus 200 determines the sequence of printing images on sides of a sheet so as to efficiently execute the print job in accordance with the content of the print job.

Figure 4:
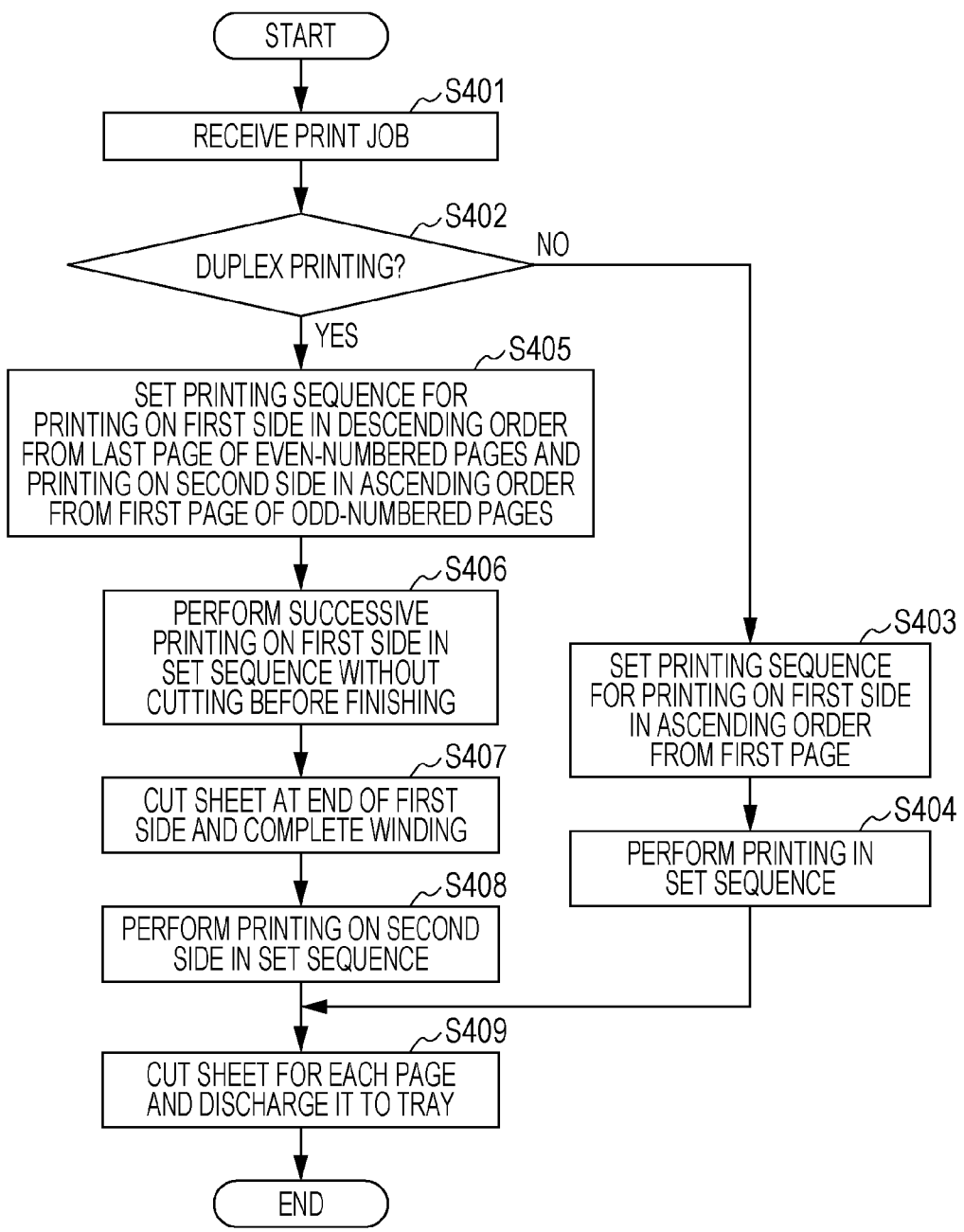
FIG. 4 is a flowchart of a process occurring when images are printed on a continuous sheet.

A procedure of a printing process occurring when printing is performed with the foregoing arrangement is described below. FIG. 4 is a flowchart that illustrates how the printing process performed by the image forming apparatus 200 proceeds. This flowchart illustrates a process performed by the CPU 201 loading a control program stored in the ROM 202 or the HDD 204 into the RAM 203 and executing the control program. This flowchart starts when the image forming apparatus 200 accepts a new print job. It is assumed that the accepted print job is the one in which specification information to specify simplex printing with arrangement illustrated in FIG. 3A or duplex printing with arrangement illustrated in FIG. 3B and print data to be printed are received from the host apparatus 211. For duplex printing with arrangement different from that illustrated in FIG. 3B, images are successively printed on the first side, and then, images are successively printed on the opposite side, as in the above-described way, except that the sequence of pages arranged is different. For printing on odd-numbered pages or printing on only a single side in part, there is a side on which an image has not been printed.

First, in S401, a print job is input from, for example, the host apparatus 211. Print data contained in the input print job has a plurality of pages, and the data of the pages is input in succession in ascending order from page 1. The CPU 201 temporarily stores this print data in the HDD 204.

Next, in S402, it is determined whether the input print job is for simplex printing or duplex printing. The determination is made based on whether specification information contained in the print job indicates printing on only a single side or on both sides of a sheet. However, the determination may be made by various methods other than a method using specification information. For example, the determination may be made by analyzing print data. If it is determined that simplex printing is to be performed (NO in S402), flow proceeds to S403; if it is determined that duplex printing is to be performed (YES in S402), flow proceeds to S405.

In S403, which corresponds to a case where only a single side is to be subjected to printing, because the arrangement illustrated in FIG. 3A is employed, the CPU 201 determines that the printing sequence is the same as the sequence of inputting images, i.e., in ascending order starting from page 1.

In S404, the CPU 201 supplies print data of each page to the image processing unit 207 to perform printing in accordance with the printing sequence determined in S403. In response to this, the image processing unit 207 converts the print data into a form that allows the engine control unit 208 to perform printing processing thereon (develops the print data into image data) and stores the obtained image data in the HDD 204. The image processing unit 207 supplies the obtained image data to the engine control unit 208 in succession in accordance with the above printing sequence. At this time, information indicating which side the image data is to be printed on and the page number and enabling the print job to be identified is also provided together with the image data to the engine control unit 208.

The engine control unit 208 having received the image data supplies a sheet corresponding to the size of an image to be printed from the upper sheet cassette 101a or the lower sheet cassette 101b. The engine control unit 208 conveys the sheet using the conveying unit 102 to a print position where the head unit 105 is to perform printing, prints images based on the image data on the sheet in succession, and conveys the sheet to a reading position where the scanner unit 107 is to perform reading. Whether the images have been correctly printed is determined based on the content of the image data obtained by the scanner unit 107 reading the formed images, and the sheet is conveyed toward the cutter unit 110. If it is determined that at least one of the images has been incorrectly printed, the CPU 201 causes the cutter unit 110 to cut the sheet to discharge a page with the incorrectly formed image. The cut sheet corresponding to that page is discharged to a tray for use in receiving defects (e.g., the lowermost tray) among the trays in the sorting unit 114. The CPU 201 supplies the image data to the engine control unit 208 to reprint the unsuccessful image data and repeats the subsequent above-described processing. If it is determined that the images have been correctly printed, flow proceeds to S409.

In S405, which corresponds to a case where both sides are to be subjected to printing, because the arrangement illustrated in FIG. 3B is employed, the CPU 201 determines that the printing sequence is descending order starting from the last page of the even-numbered pages for the first side and ascending order starting from the first page of the odd-numbered pages for the second side. That is, to make pages be in series on the same side of each of the first side and the second side, the printing sequence is page 14 (on the first side), 12 (on the first side), . . . , 2 (on the first side), 1 (on the second side), 3 (on the second side), . . . , and 13 (on the second side). This printing sequence differs from the sequence of inputting print data (the sequence of pages). The sequence of printing on the first side differs from the printing sequence for simplex printing.

Then in S406, the CPU 201 supplies print data of each page to the image processing unit 207 in the printing sequence determined in S405 to perform printing in accordance with the printing sequence determined in S405. In response to this, the image processing unit 207 converts the print data for the first side into a form that allows the engine control unit 208 to perform printing processing thereon (develops the print data into image data) and stores the obtained image data in the HDD 204. The image processing unit 207 supplies the obtained image data to the engine control unit 208 in the above page sequence. At this time, information indicating which side the image data is to be printed on and the page number and enabling the print job to be identified is also provided together with the image data to the engine control unit 208.

The engine control unit 208 having received the image data supplies a sheet corresponding to the size of an image to be printed from the upper sheet cassette 101a or the lower sheet cassette 101b. The engine control unit 208 conveys the sheet using the conveying unit 102 to a print position where the head unit 105 is to perform printing, prints images based on the image data on the first side of the sheet in succession, and conveys the sheet to a reading position where the scanner unit 107 is to perform reading. Whether the images have been correctly printed is determined based on the content of the image data obtained by the scanner unit 107 reading the formed images, and the sheet is conveyed toward the cutter unit 110. If it is determined that the images have been correctly printed, the sheet with the pages being connected together is caused to pass through the drying unit 112 without being cut on a page basis by the cutter unit 110. The sheet is subjected to drying of ink and then is wound by the sheet winding unit 113. In contrast, if it is determined that at least one of the images has been incorrectly printed, the CPU 201 causes the cutter unit 110 to cut the sheet to discharge a page with the incorrectly formed image. The cut sheet corresponding to that page is discharged to a tray for use in receiving defects (e.g., the lowermost tray) among the trays in the sorting unit 114. The CPU 201 supplies the image data to the engine control unit 208 to reprint the unsuccessful image data and repeats the subsequent above-described processing.

In the above-described way, when it is determined that the images of the pages specified to be printed on the first side have been correctly printed, flow proceeds to S407. In S407, the CPU 201 causes the cutter unit 110 to cut the sheet with the images formed on the first side at the end of printing on the first side if needed. That is, in the case of arrangement illustrated in FIG. 3B, the sheet is cut at a location of the end of printing the image of page 2 (with a margin if needed). When winding the sheet by the sheet winding unit 113 has been completed, the process proceeds to printing on the second side. At this time, the image data for the first side remains in the HDD 204 to be ready for the occurrence of poor printing on the second side.

Then in S408, the CPU 201 supplies print data of each page for the second side to the image processing unit 207 to perform printing on the second side in the printing sequence determined in the above way. The image processing unit 207 converts the print data for the second side into a form that allows the engine control unit 208 to perform printing processing thereon (develops the print data into image data) and stores the obtained image data in the HDD 204. At this time, depending on the content of specification for printing, the image data may be rotated by approximately 180°. The obtained image data is supplied to the engine control unit 208 in the above page sequence. Also in this case, information indicating which side the image data is to be printed on and the page number and enabling the print job to be identified is also provided together with the image data to the engine control unit 208, as in the case of printing on the first side.

The engine control unit 208 conveys the sheet with the images formed on its first side wound in the sheet winding unit 113 to the conveying unit 102 again, and images of the pages are printed on the second side in sequence. For printing on the second side of the sheet, conveying the sheet from the sheet winding unit 113 starts such that an end at which the cutter unit 110 has cut is first conveyed and such that the sheet is reversed so as to make the second side face the head unit 105. When the sheet is conveyed to a print position where the head unit 105 is to perform printing, the engine control unit 208 prints images of pages whose printing is specified at the back sides of corresponding images on the first side in succession. The scanner unit 107 determines whether printing has been correctly performed, as in the case of printing on the first side. If poor printing occurs, the sheet is cut and the cut section is discharged to a tray for receiving defects. For the occurrence of poor printing, image data corresponding to the relevant page is read from the HDD 204, and the first side and the second side are subjected to printing again. Here, the details of reprinting images on both sides are omitted. In this way, a plurality of images are successively printed on the first side and, after completion of printing all images scheduled to be printed on the first side at a time, images to be arranged at the back sides of the images printed on the first side are successively printed on the second side.

In S409, the sheet with the correctly formed images is cut on a page basis by the cutter unit 110. If the cut sheets have been determined to be correctly printed, they are caused to pass through the drying unit 112 while being subjected to drying of ink. Then the sheets are conveyed to the sorting unit 114 in succession and discharged to a specified tray. Depending on the number of pages printed in S404 and S408, the processing of S404 and S408 and the processing of S409 may be performed in synchronization with each other. If a tray is specified in a print job, that tray is the destination to which the sheets are discharged. If no tray is specified, an empty tray is selected.

In the above-described way, determining the printing sequence for each of simplex printing and duplex printing enables both simplex printing and duplex printing to discharge sheets face down and to, when a plurality of sheets are discharged, have the same sequence of the sheets arranged. Accordingly, in collecting discharged sheets by a user, confusion caused by rearranging the sheets or by the coexistence of face-up discharging and face-down discharging can be avoided.

Although sheets are stacked on the small trays disposed in the upper section of the sorting unit 114 with the sheets standing, the sheets are stacked in the correct sequence because pages are discharged from the smallest page number in succession. Here, up to the maximum permissible number of sheets for a tray, all the sheets are discharged to the same tray. This aims to discharge a print matter based on a single print job (order) to the same tray if possible. If a job exceeds the maximum permissible number of sheets for a tray, sheets exceeding the maximum permissible number are discharged to another tray. If a printed matter based on a single print job is discharged to a plurality of trays, the LED on each of the plurality of trays emits beams with the same color. This enables a user to easily identify that printed matters discharged to the plurality of trays are based on the single print job. Other than the use of the same color emission of LEDs, another method, such as the use of displaying on the operating unit 206, can be employed in notifying a user that a single print job is output to a plurality of trays.

In the above-described example, for both simplex printing and duplex printing, sheets are discharged face down. Alternatively, for both printing, sheets may be discharged face up. In this case, for simplex printing, the sheet winding unit 113 is employed, as in the case of the above-described duplex printing. When face-up discharging is set in the image forming apparatus 200, if simplex printing is specified, printing is performed in descending order from the last page and, even with simplex printing, the sheet with the formed images is wound by the sheet winding unit 113. At this time, the sheet is not cut on a page basis by the cutter unit 110. The sheet is cut by the cutter unit 110 at the end of the sheet (at a location where printing the image on the first page has been completed), and the sheet is wound by the sheet winding unit 113. After the completion of winding the sheet by the sheet winding unit 113, the sheet is reversed and conveyed again. At this time, without printing on the second side, the sheet is cut on a page basis by the cutter unit 110, and the cut sheets are discharged to a specified tray in the sorting unit 114. This enables the sheets to be discharged in sequence from the last page face up for simplex printing.

To discharge sheets face up for duplex printing, the printing sequence is that the odd-numbered pages are subjected to printing on the first side in ascending order from the first page and the even-numbered pages are subjected to printing on the second side in descending order from the last page in substantially the same way as for the above-described duplex printing. With this, sheets can be discharged face up such that the sheets are stacked in succession from a sheet containing the last page to a sheet having a smaller page number. In this way, for both simplex printing and duplex printing, the sheets can be discharged face up in the same sequence of pages arranged.

A user may select stacking sheets with formed images in succession from a small page number such that their discharge surfaces are placed face down or, in contrast to this, stacking sheets with formed images in succession such that a sheet having a smaller page number is discharged last and such that their discharge surfaces are placed face up, as described above. In this case, either one can be specified by an operation from a user through the operating unit 206 or the host apparatus 211, the content of the specifying can be stored in the RAM 203, and, in response to this, the CPU 201 can select a method of discharging sheets and the printing sequence. The method used in discharging sheets may be displayed on the operating unit 206 when they are discharged. Alternatively, the image forming apparatus 200 may discharge sheets only by either one method.

In the foregoing description, the cutter unit 110 cuts a sheet on a job basis or on a page basis. However, the sheet may be cut in another way. That is, the image forming apparatus 200 may not include the cutter unit 110, and, for duplex printing, images are printed on the first side until the sheet cassette becomes empty of the sheet and printing on the opposite side may be performed after the end of the sheet is used. In this case, a user may cut the sheet using another cutter device. It is not necessary to continue printing on the first side until the cassette become empty of the sheet. For example, after a user cuts the sheet using a cutter before the end of the sheet, a side to be subjected to printing of the sheet may be changed, the sheet may be set again, and printing on the second side may be performed.

In the foregoing example, for a case where a sheet is reversed, the sheet is wound by the sheet winding unit 113. However, the sheet may wait without being wound in a roll. That is, after images are successively printed on the first side of a sheet, the sheet may wait (the sheet may be retained). In this case, any state of waiting or any way of reversing the sheet may be employed as long as a reversing mechanism of reversing the sheet and allowing printing on the second side to be performed is used. As previously described, a sheet that is not subjected to printing on the first side may be reversed and then subjected to printing on the second side.

In the foregoing description, processing of determining the printing sequence, other than printing processing, may be achieved by an external apparatus, such as a host apparatus or an external controller, and in accordance with this, the image forming apparatus may perform printing. In this case, the external apparatus obtains a status (information indicating the occurrence of an error or the progress of printing) from the image forming apparatus and determines the printing sequence and arrangement of images. In this case, the external apparatus functions as the print control apparatus.

The embodiments of the present invention can also be achieved by execution of the following processing. That is, software (program) for achieving the functions of the above-described embodiments is supplied to a system or an apparatus over a network or through various kinds of storage medium, and a computer (or CPU or MPU) of the system or the apparatus reads the program and executes it. The program may be executed by a single computer or by a plurality of computers working together. Not all of the above-described processing may be achieved by software. Part or all thereof may be achieved by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus capable of causing a print unit to print data on a continuous sheet, the apparatus comprising:
    a reception unit configured to receive data of a plurality of pages to be printed by the print unit;
    a determination unit configured to determine whether the data of the plurality of pages received by the reception unit is to be printed on a single side of the continuous sheet or on both sides of the continuous sheet; and
    a print control unit configured to cause the print unit to print the data of the plurality of pages received by the reception unit on the continuous sheet in a manner such that an orientation of a front surface of each discharged sheet of duplex printing from the continuous sheet in a case of being discharged after having been printed on its both sides and an orientation of a front surface of each discharged sheet of simplex printing from the continuous sheet in a case of being discharged after having been printed on its single side is the same, wherein each discharged sheet of duplex printing and of simplex printing have the front surface and a back surface,
    wherein, in a case where the determination unit determines that simplex printing is to be performed, the print control unit causes the print unit to print each page to be arranged on the front surface of a discharged sheet of simplex printing first, and
    wherein, in a case where the determination unit determines that duplex printing is to be performed, the print control unit causes the print unit to print each page to be arranged on the back surface of a discharged sheet of duplex printing first.

2. The apparatus according to claim 1, wherein the print control unit is configured to cause the print unit to print the data in a manner such that a sheet on which a first page image of a first odd-numbered page in the data is printed is discharged in a state where the first page image faces upward.

3. The apparatus according to claim 2, wherein the print control unit is configured to cause the print unit to print the data in a manner such that discharged sheets are arranged in ascending order.

4. The apparatus according to claim 1, wherein the print control unit is configured to cause the print unit to print the data in a manner such that a sheet on which a first page image of a first odd-numbered page in the data is printed is discharged in a state where the first page image faces downward.

5. The apparatus according to claim 4, wherein the print control unit is configured to cause the print unit to print the data in a manner such that discharged sheets are arranged in descending order.

6. The apparatus according to claim 1, further comprising a cutting unit configured to cut the continuous sheet printed by the print unit into cut sheets by controlling a cutter.

7. The apparatus according to claim 6, wherein, in a case where the determination unit determines that the data is to be printed on the single side of the continuous sheet, the cutting unit cuts the printed continuous sheet based on a predetermined unit, and wherein, in a case where the determination unit determines that the data is to be printed on both sides of the continuous sheet, the cutting unit does not cut the continuous sheet based on the predetermined unit during printing on a first side of the continuous sheet and cuts the continuous sheet based on the predetermined unit during printing on a second side of the continuous sheet.

8. The apparatus according to claim 7, wherein, in a case where the determination unit determines that the data is to be printed on both sides of the continuous sheet, the cutting unit cuts the continuous sheet at an end of printing on the first side of the continuous sheet after completion of printing the data of pages to be arranged on the first side of the continuous sheet.

9. The apparatus according to claim 6, further comprising a sorting control unit configured to control receiving of the discharged cut sheets by a tray in a sorting unit.

10. The apparatus according to claim 1, wherein, in a case where the determination unit determines that the data is to be printed on both sides of the continuous sheet, the print control unit causes the print unit to successively print data of pages to be arranged on a first side of the continuous sheet among the data of the plurality of pages received by the reception unit and then to print data of pages to be arranged on a second side of the continuous sheet.

11. The apparatus according to claim 1, further comprising a selecting unit configured to select a discharging method for a discharge unit from one of a face-up discharging method and a face-down discharging method, wherein the print control unit reverses an arranged order of pages in printing by the print unit depending on whether the selecting unit selects the face-up discharging method or the face-down discharging method.

12. The apparatus according to claim 1, further comprising the print unit.

13. A method for an apparatus capable of causing a print unit to print data on a continuous sheet, the method comprising:
    receiving data of a plurality of pages to be printed by the print unit;
    determining whether the received data of the plurality of pages is to be printed on a single side of the continuous sheet or on both sides of the continuous sheet; and
    causing the print unit to print the received data of the plurality of pages on the continuous sheet in a manner such that an orientation of a front surface of each discharged sheet of duplex printing from the continuous sheet in a case of being discharged after having been printed on its both sides and an orientation of a front surface of each discharged sheet of simplex printing from the continuous sheet in a case of being discharged after having been printed on its single side is the same, wherein each discharged sheet of duplex printing and of simplex printing have the front surface and a back surface, wherein, in a case where it is determined that simplex printing is to be performed, causing includes causing the print unit to print each page to be arranged on the front surface of a discharged sheet of simplex printing first, and wherein, in a case where it is determined that duplex printing is to be performed, causing includes causing the print unit to print each page to be arranged on the back surface of a discharged sheet of duplex printing first.

14. The method according to claim 13, wherein causing includes causing the print unit to print the data in a manner such that a sheet on which a first page image of a first odd-numbered page in the data is printed is discharged in a state where the first page image faces upward.

15. The method according to claim 14, wherein causing includes causing the print unit to print the data in a manner such that discharged sheets are arranged in ascending order.

16. The method according to claim 13, wherein causing includes causing the print unit to print the data in a manner such that a sheet on which a first page image of a first odd-numbered page in the data is printed is discharged in a state where the first page image faces downward.

17. The method according to claim 16, wherein causing includes causing the print unit to print the data in a manner such that discharged sheets are arranged in descending order.

18. A non-transitory computer-readable storage medium storing a program to cause an apparatus, capable of causing a print unit to print data on a continuous sheet, to perform a method, the method comprising:

receiving data of a plurality of pages to be printed by the print unit;

determining whether the received data of the plurality of pages is to be printed on a single side of the continuous sheet or on both sides of the continuous sheet; and causing the print unit to print the received data of the plurality of pages on the continuous sheet in a manner such that an orientation of a front surface of each discharged sheet of duplex printing from the continuous sheet in a case of being discharged after having been printed on its both sides and an orientation of a front surface of each discharged sheet of simplex printing from the continuous sheet in a case of being discharged after having been printed on its single side is the same, wherein each discharged sheet of duplex printing and of simplex printing have the front surface and a back surface, wherein, in a case where it is determined that simplex printing is to be performed, causing includes causing the print unit to print each page to be arranged on the front surface of a discharged sheet of simplex printing first, and wherein, in a case where it is determined that duplex printing is to be performed, causing includes causing the print unit to print each page to be arranged on the back surface of a discharged sheet of duplex printing first.

* * * * *